US012340782B1

(12) United States Patent
Richerme

(10) Patent No.: US 12,340,782 B1
(45) Date of Patent: Jun. 24, 2025

(54) GUITAR HANGING DEVICE

(71) Applicant: John Richerme, Charleston, IL (US)

(72) Inventor: John Richerme, Charleston, IL (US)

( * ) Notice: Subject to any disclaimer, the term of this patent is extended or adjusted under 35 U.S.C. 154(b) by 0 days.

(21) Appl. No.: 18/773,442

(22) Filed: Jul. 15, 2024

(51) Int. Cl.
  *G10G 5/00* (2006.01)
  *F16M 13/02* (2006.01)

(52) U.S. Cl.
  CPC .............. *G10G 5/00* (2013.01); *F16M 13/02* (2013.01)

(58) Field of Classification Search
  CPC .................................. G10G 5/00; F16M 13/02
  See application file for complete search history.

(56) References Cited

U.S. PATENT DOCUMENTS

| | | | | |
|---|---|---|---|---|
| 3,765,633 | A * | 10/1973 | Caudill | G10G 5/00 |
| | | | | 248/447.2 |
| 4,991,809 | A * | 2/1991 | Harkey | G10G 5/00 |
| | | | | 248/316.4 |
| 5,121,890 | A * | 6/1992 | Komada | G10G 5/00 |
| | | | | 248/167 |
| 5,375,497 | A * | 12/1994 | Pirchio | G10G 5/00 |
| | | | | 248/443 |
| 5,645,256 | A * | 7/1997 | Thomas, II | G10G 5/00 |
| | | | | 403/325 |
| 6,204,440 | B1 * | 3/2001 | Yu | G10G 5/00 |
| | | | | 84/421 |
| 6,481,677 | B1 * | 11/2002 | Yu | A47F 5/083 |
| | | | | 84/327 |
| 7,446,249 | B2 * | 11/2008 | Driscoll | G10G 5/00 |
| | | | | 84/327 |
| 7,717,377 | B1 * | 5/2010 | Corrado | G10G 5/00 |
| | | | | 248/150 |
| 9,899,011 | B2 * | 2/2018 | Gallo | G10G 5/00 |
| 9,984,667 | B2 * | 5/2018 | Walker | F16M 13/02 |
| 10,900,606 | B2 * | 1/2021 | Gaines | G10G 5/00 |
| 11,264,001 | B1 * | 3/2022 | Maalouf | F16M 11/10 |
| 11,610,567 | B1 * | 3/2023 | Maalouf | G10G 5/00 |
| 11,727,903 | B2 * | 8/2023 | Carr | G10G 5/00 |
| | | | | 84/327 |
| 2019/0066637 | A1 * | 2/2019 | Ugactz | F16M 13/027 |
| 2021/0256945 | A1 * | 8/2021 | Micco | G10D 1/08 |

FOREIGN PATENT DOCUMENTS

| | | | | |
|---|---|---|---|---|
| GB | | 2592287 A * | 8/2021 | G10G 5/00 |
| WO | WO-2007107172 A1 * | | 9/2007 | G10G 5/00 |

* cited by examiner

*Primary Examiner* — Robert W Horn
(74) *Attorney, Agent, or Firm* — Erickson Law Group, PC

(57) ABSTRACT

A guitar hanging device includes a substantially L-shaped first bracket having a substantially vertical first leg and a substantially horizontal first leg, the substantially horizontal first leg sized and configured to fit between two external stacked objects. A guitar hanging fork structure is attached to an upper portion of the substantially vertical first leg. A substantially L-shaped second bracket has a substantially horizontal second leg and a substantially vertical second leg, the second bracket being adjustably connected to the first bracket between the vertical first and second legs, with the substantially horizontal second leg adjustable in elevation with respect to the substantially horizontal first leg to clamp a portion of the second object therebetween. A compressible pad can be arranged on the horizontal first leg to take up any slack between the horizontal first leg and the first object.

11 Claims, 6 Drawing Sheets

GUITAR HANGING DEVICE

BACKGROUND

There are known guitar hangers for wall mounting, including U.S. Pat. D921,747; D701449 and 6,231,018; and US Published Application US2016/0335994, all herein incorporated by reference.

There are known guitar stands, including U.S. Pat. Nos. D995, 172; D675,039 and 10,089,969; and US Published Applications US2024/0085014 and 2016/011070, all herein incorporated by reference.

Guitar hangers for wall-mounting guitars have the drawback that they are permanent fixtures and lack flexibility of placement. Guitar stands have the drawback that they can be knocked over and they require floor space to provide a wide-enough base to prevent tipping of the guitar stand and guitar held thereby. These drawbacks are especially problematic when guitars are used on stage for a live performance. During a live performance, a guitar player may switch guitars, such as between an acoustic guitar and an electric guitar. The present inventor has recognized that the non-used guitar should be stored upright for easy access to the guitar player to switch guitars. Additionally, a guitar player may take breaks during a performance and the present inventor has recognized that the guitar should be stored upright during the breaks.

The present inventor has recognized that it would be desirable to provide a guitar holding device that was convenient to use, required little floor space, and can be adapted to be used on stage during a live performance.

SUMMARY

An exemplary embodiment of the invention provides a guitar hanging device that includes a guitar hanging fork structure mounted to at least one bracket that includes a generally horizontal leg that fits between two stacked objects, such as between a amplifier head and a speaker cabinet. The hanging device can include a second bracket the is fastened to the first bracket to form a clamp to clamp the hanging device to a lower one of the stacked objects, such as to the speaker cabinet.

The exemplary embodiment provides a guitar hanging device that comprises a substantially L-shaped first bracket having a substantially vertical first leg and a substantially horizontal first leg, the substantially horizontal first leg sized and configured to fit between two stacked external objects; and a guitar hanging fork structure attached to an upper portion of the substantially vertical first leg.

The guitar hanging device can include a substantially L-shaped second bracket having a substantially horizontal second leg and a substantially vertical second leg, the second bracket being adjustably connected to the first bracket with the substantially horizontal second leg adjustable in elevation with respect to the substantially horizontal first leg to clamp a portion of the second object therebetween.

The guitar hanging device can include a resilient pad fixed onto a top surface of the substantially horizontal first leg having a thickness compressible to take up any vertical clearance between the two objects.

The guitar hanging can include a hand-operated screw fastener arranged to fix the relative vertical elevation of the substantially horizontal first leg and the substantially horizontal second leg when tightened.

The guitar hanging device can be designed to work in conjunction with popular instrument wall hangers, and is designed to hang the instrument from compatible amplifiers or shelf units. The guitar hanging device uses weight in conjunction with an adjustable lower clamp for stabilization. The guitar hanging device sets on a flat surface such as on a speaker cabinet or on a shelf or table. The guitar hanging device is then supported by placing the amplifier over a lower portion of the guitar hanging device. A pad, such as flexible foam secured on a top surface of the lower portion keeps the engagement between the amplifier and the guitar hanging device tight and secure. An adjustable clamp is then opened, and a lower part of the adjustable clamp is held firmly against a bottom of a lip of the speaker cabinet or shelf or table and tightened for added support.

Numerous other advantages and features of the present invention will become readily apparent from the following detailed description of the invention and the embodiments thereof, from the claims and from the accompanying drawings.

DETAILED DESCRIPTION

Figure 1:
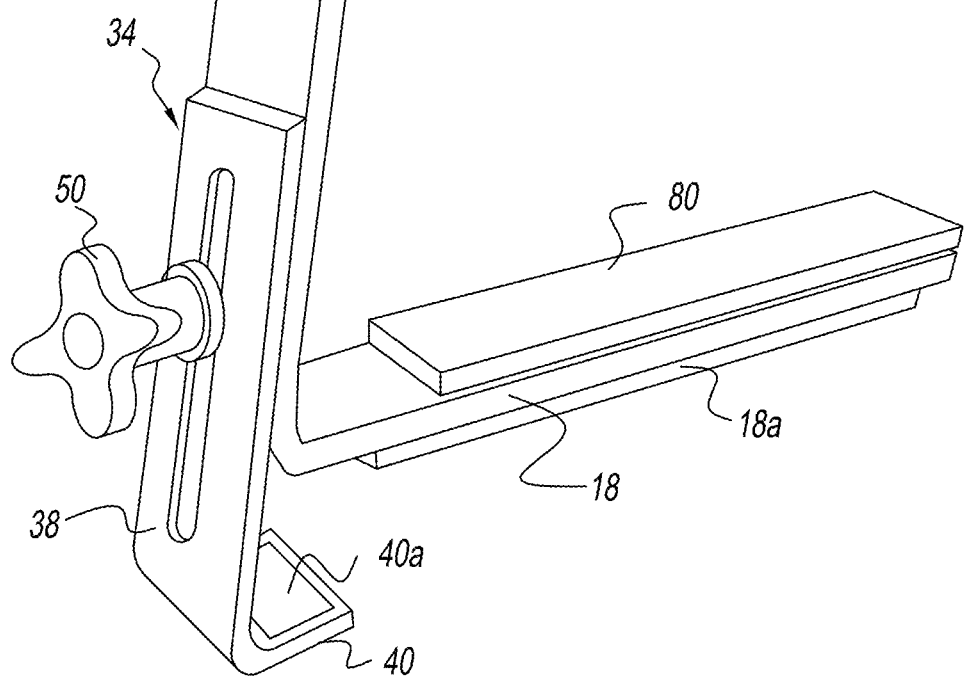
FIG. 1 is a perspective view of a portion of a guitar hanging device according to one embodiment of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a guitar hanging device 10 according to an exemplary embodiment, with a guitar hanging hook and a guitar removed to see underlying parts. The guitar hanging device 10 includes a substantially L-shaped first bracket 14 comprising a substantially vertical first leg 16 and a substantially horizontal first leg 18. A second substantially L-shaped bracket 34 having a substantially vertical second leg 38 and a substantially horizontal second leg 40 is fixed to the bracket 14 by a knob screw fastener 50.

The vertical first leg 16 includes plain holes 22, 24 and a threaded hole 26. The second bracket 34 includes a vertical, elongated slot 44 through the substantially vertical second leg 38.

Figure 2:
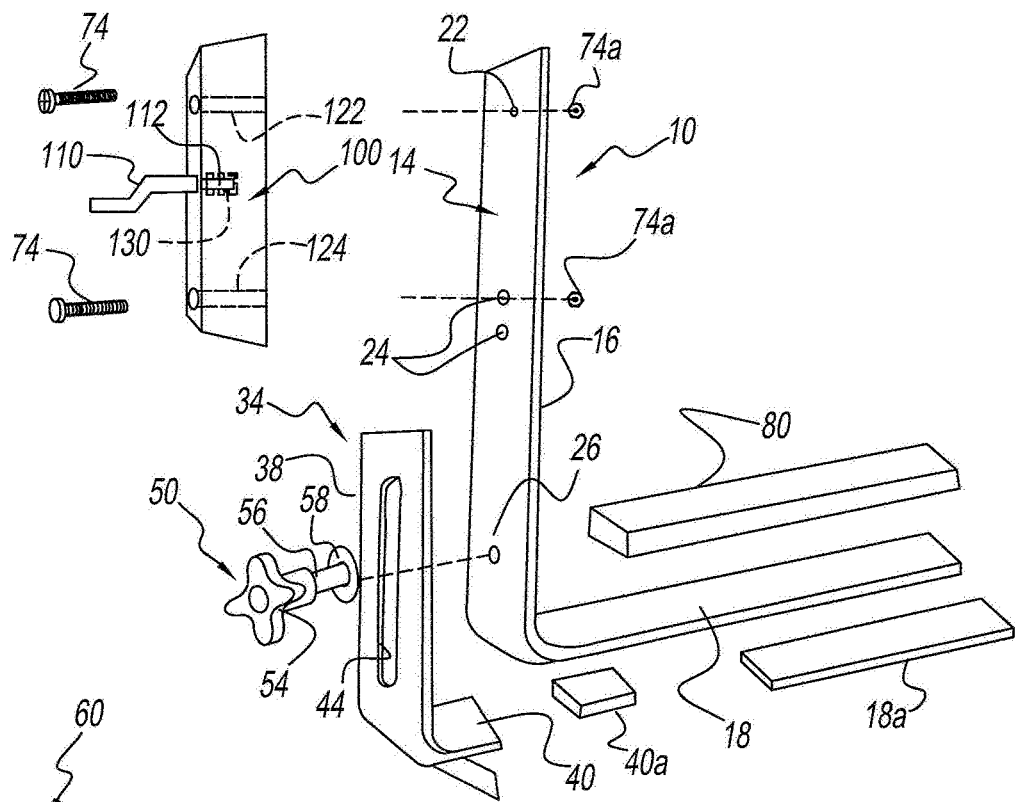
FIG. 2 is an exploded perspective view of the guitar hanging device of FIG. 1 with an added guitar hanging fork structure.

As shown in FIG. 2, the knob screw fastener 50 includes a turning knob 54 and a threaded stud 56 that is fixed for non-rotation with the knob 54. A washer 58 is fit over the stud 56 and is sized to press against the substantially vertical second leg 38 on opposite sides of the slot 44. The vertical slot 44 allows relative vertical adjustment between the substantially vertical first leg 16 and the substantially vertical second leg 38 of the first bracket 14 and the second bracket 34 respectively. This will adjust a vertical space between the substantially horizontal first leg 18 of the first bracket 14 and the substantially horizontal second leg 40 of the second bracket 34. Once the vertical space is adjusted to a correct spacing, the knob 54 can be turned and the threaded stud 56 threaded into the threaded hole 26 to fix the position of the second bracket 34 with respect to the first bracket 14. A pad 80, such as a flexible foam, is adhesively secured to an upper side of the substantially horizontal leg 18.

An anti-slip pad 18a is fixed to a bottom of the substantially horizontal first leg 18. This pad 18a provides a gripping or friction surface on an exposed surface thereof. It can be composed of 1/16-inch anti-slip rubber and it can have a self-adhesive surface to stick to a bottom side of the substantially horizontal first leg 18. An anti-slip pad 40a is fixed to a top of the substantially horizontal second leg 40. This pad 40a provides a gripping or friction surface on an exposed surface thereof. It can be composed of 1/16-inch anti-slip rubber and it can have a self-adhesive surface to stick to a top side of the substantially horizontal second leg 40. The two pads 18a, 40a provide a gripping or friction between the legs 18, 40 when they are clamped onto an object, such as a speaker cabinet frame or a shelf or a table.

A guitar-hanging block 100 is provided to carry a guitar hanging fork structure 110. The guitar-hanging block 100 is fastened to the substantially vertical first leg 16 by two screws 74 that passed through holes 122, 124 through the guitar-hanging block 100, through holes 22, 24 through the leg 16, and are threaded into nuts 74a on a backside of the substantially vertical first leg 16, to secure the guitar-hanging block 100 onto the substantially vertical first leg 16. There are two holes 24 to accommodate different size blocks 100. The guitar-hanging block 100 can be composed of wood or other material for structural and decorative purposes and the guitar hanging fork structure 110 includes a threaded center screw 112 that can be threaded or screwed into a hole 130 in the guitar-hanging block 100.

Figure 2A:
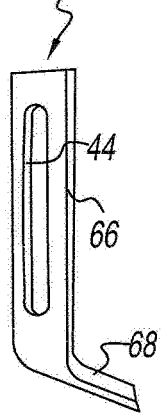
FIG. 2A is a perspective view of an alternate portion of the guitar hanging device of FIG. 2.

Also shown in FIG. 2A is an alternate second bracket 60 being substantially identical to the second bracket 34 but having an obtuse angle between a substantially vertical leg 66 and a substantially horizontal like 68 for the purposes of versatility in clamping the guitar holding device 10 to different objects or profiles.

Figure 3:
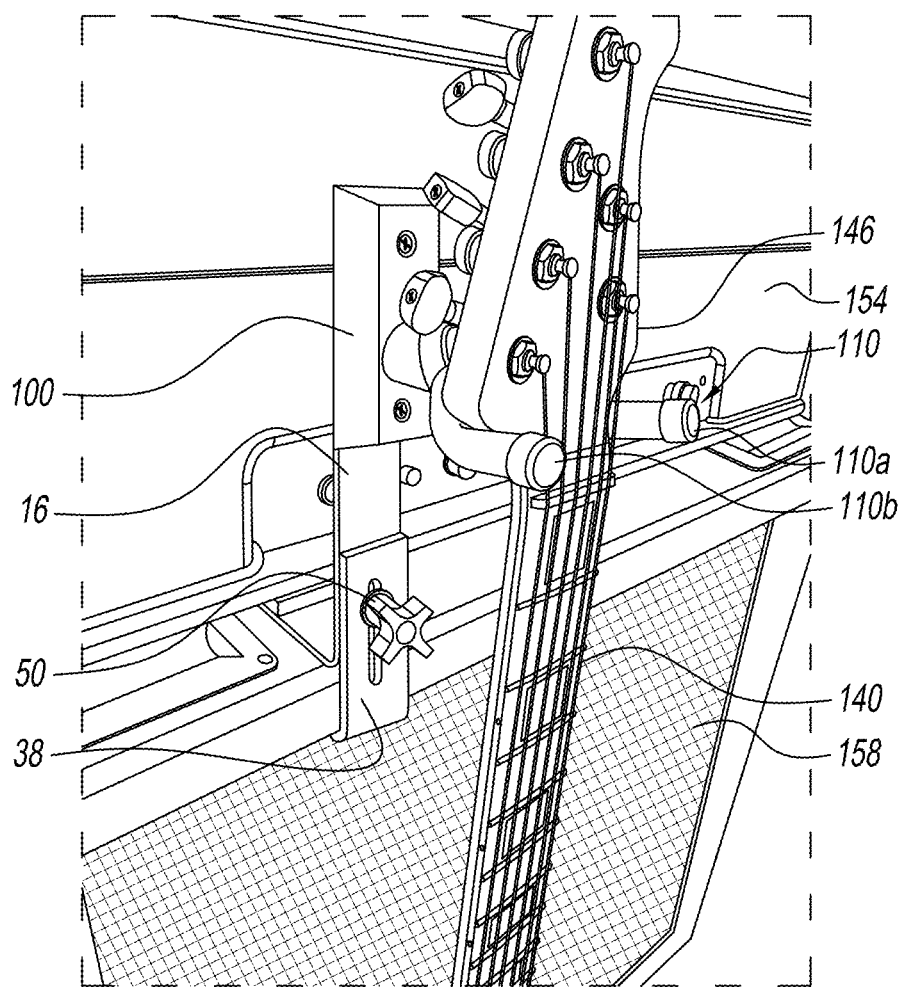
FIG. 3 is a fragmentary perspective view of the guitar hanging device of FIG. 2 shown hanging a guitar from an amplifier speaker cabinet arrangement.
Figure 4:
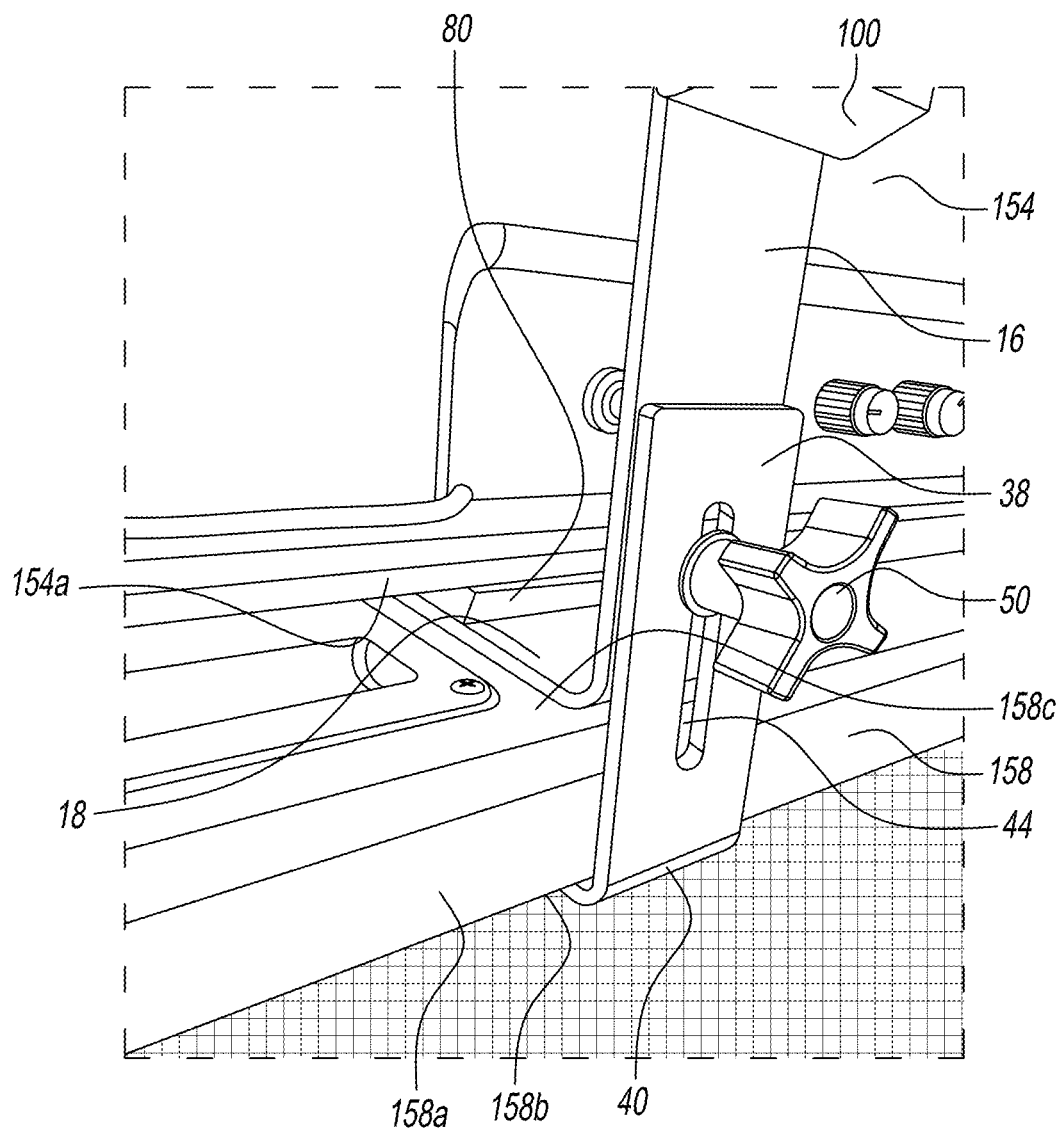
FIG. 4 is an enlarged fragmentary perspective view of the arrangement of FIG. 3 with the guitar removed.
Figure 5:
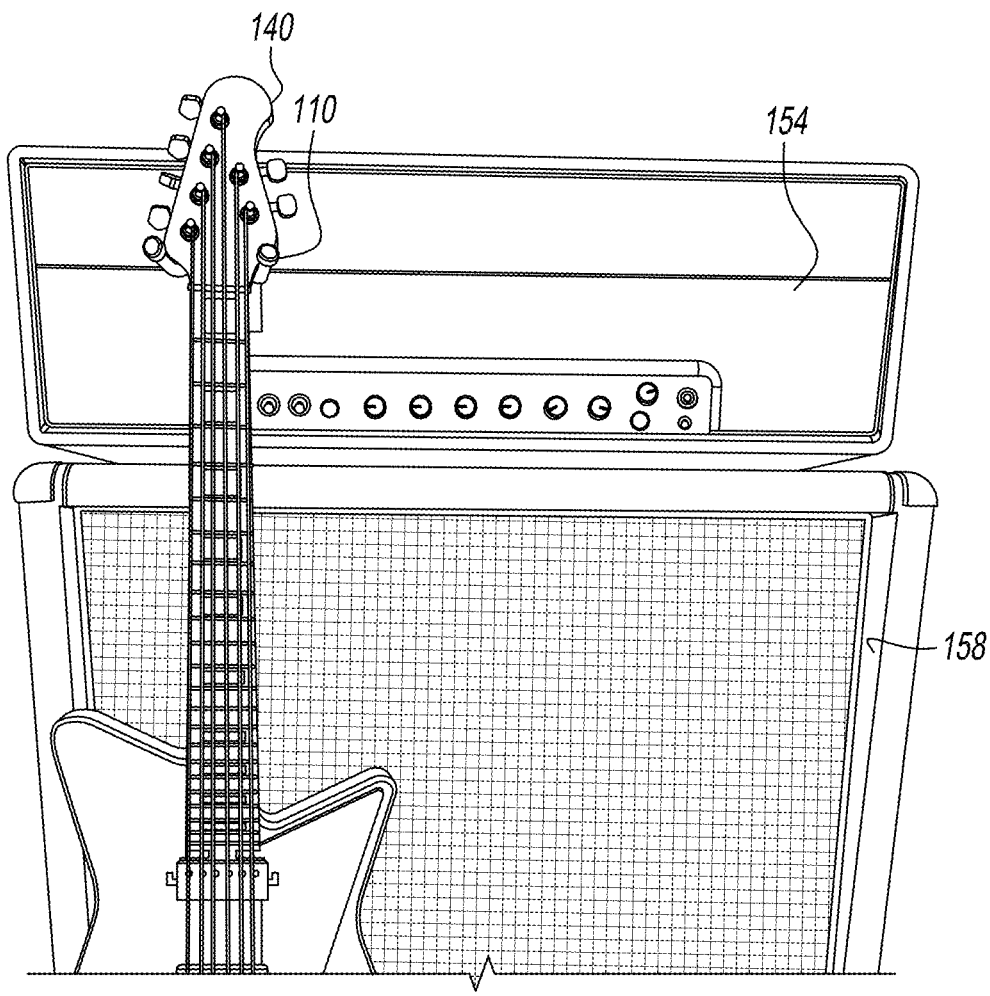
FIG. 5 is a perspective view of a guitar hanging from an amplifier speaker cabinet using the device of FIG. 2.

FIGS. 3-5 illustrates a guitar 140 supported by the guitar hanging device 10 wherein the guitar 140 is hung from the guitar hanging fork structure 110 which is screwed into the guitar-hanging block 100. A guitar neck 145 fits between tines 110a, 110b of the fork structure while the head stock 146 of the guitar 140 rests on the tines 110a, 110b. Guitar-hanging block 100 is attached to the substantially vertical first leg 16. The substantially horizontal first leg 18 overlies a top surface 158c of a frame 158a of a speaker cabinet 158 and underlies a bottom surface 154a of a head amplifier 154, supported on the speaker cabinet 158. The substantially horizontal first leg 18 of the first bracket 14 overlies the frame 158a of the speaker cabinet 158, while the substantially horizontal second leg 40 underlies the frame 158a, particularly under a lip 158b of the frame 158a. The relative elevations of the two horizontal legs 18, 40 are temporarily held by the user to clamp the speaker cabinet frame 158a therebetween, and the hand screw fastener 50 is tightened to maintain the relative elevations. The pad 80 causes an upward force against the underside of the amplifier as a weight of the guitar would tend to pry up the substantially horizontal leg 18. The pads 18a, 40a grip the cabinet frame 158a.

In this way, the guitar is securely held by one or both of the interactions between the substantially horizontal first leg 18 pressing the pad 80 up against the amplifier head and the substantially horizontal first leg 18 and the substantially horizontal second leg 40 clamping the frame 158a of the speaker cabinet.

In operation, the substantially horizontal first leg 18 is inserted between the head amplifier 154 and the speaker cabinet 158, with the pad 80 compressing to take up any excess clearance between a bottom of the amplifier head and a top of the speaker cabinet. The second L-shaped bracket 34 is initially loose from the first L-shaped bracket 14 allowing movement of the knob threaded stud 56 through the slot 44. The substantially horizontal second leg 40 is vertically adjusted with respect to the substantially horizontal first leg 18 to clamp the speaker cabinet frame 158a between the substantially horizontal first leg 18 and the substantially horizontal second leg 40 and the knob threaded fastener 50 is then tightened by turning the knob 54 to fix the relative positions of the substantially horizontal legs 18, 40.

Figure 6:
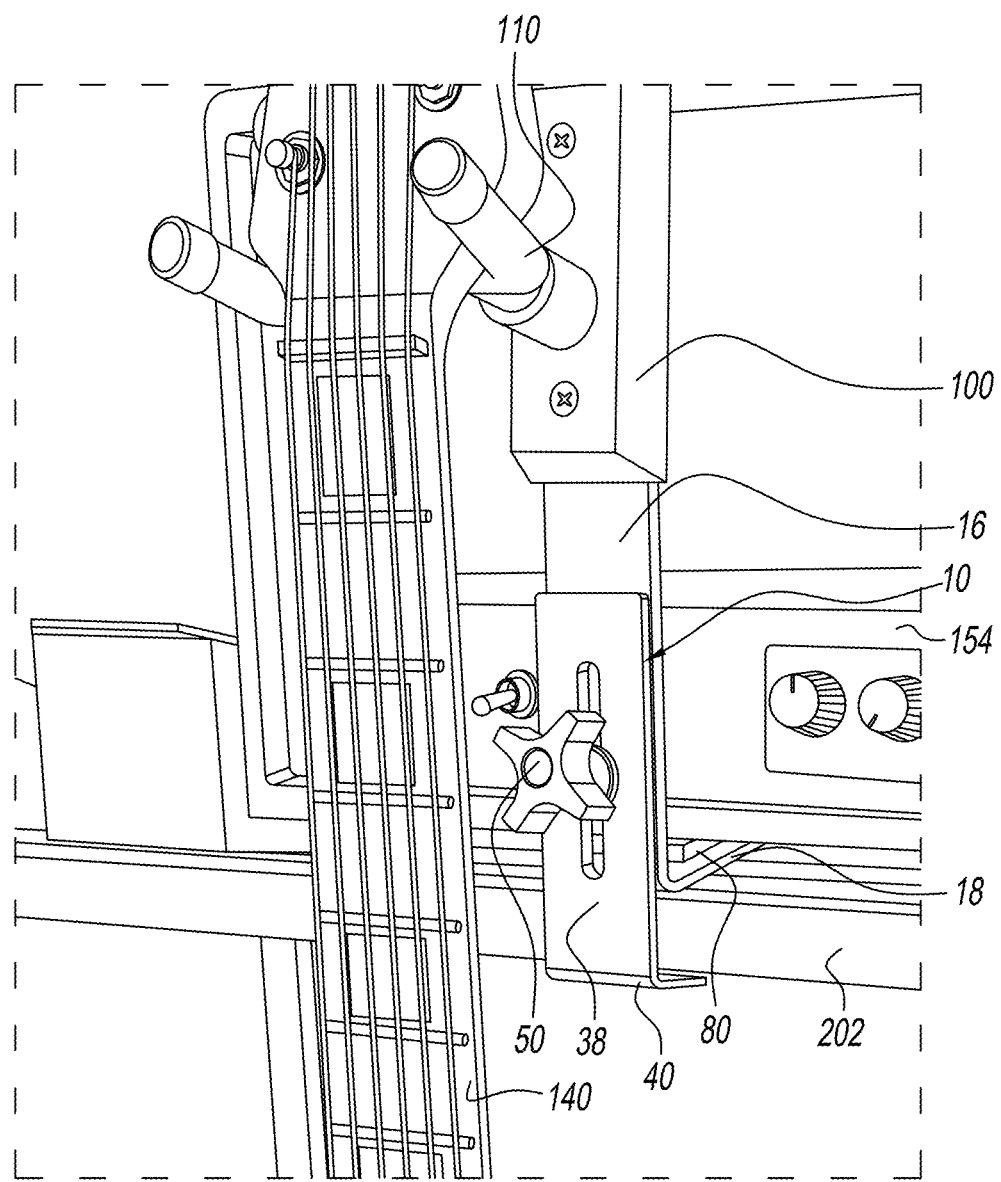
FIG. 6 is a fragmentary perspective view of the guitar hanging device hanging a guitar from a shelf or table.

FIG. 6 illustrates the guitar hanging device 10 used to hang a guitar 140 from a shelf or table 202. The device is used in substantially identical fashion as the above-described embodiment except the substantially horizontal first leg 18, having the overlying pad 80, is clamped to the shelf or table in cooperation with the substantially horizontal second leg 40. The pad 80 takes up any clearance between the shelf or table 202 and the bottom of the amplifier head 154. The knob screw attachment 50 fixes the substantially horizontal first leg and the substantially horizontal second leg in relative position. The substantially horizontal first leg 18 includes the anti-slip pad 18a, as described in FIGS. 1 and 2, to provide a gripping or friction against a top surface of the shelf or table 202. The substantially horizontal second leg 40 includes the anti-slip pad 40a to provide a gripping or friction against the underside of the shelf or table 202. The guitar hanging device is held upright under the weight of the guitar, by a downward force of the weight of the amplifier head and a clamping force caused by the substantially horizontal legs 18, 40.

From the foregoing, it will be observed that numerous variations and modifications may be effectuated without departing from the spirit and scope of the invention. It is to be understood that no limitation with respect to the specific apparatus illustrated herein is intended or should be inferred.

The invention claimed is:

1. A guitar hanging device, comprising:
   a first bracket having a substantially vertical first leg and a substantially horizontal first leg, the substantially horizontal first leg being substantially flat and sized and configured to slide between two external objects on a front side thereof; and
   a guitar hanging fork structure attached to an upper portion of the substantially vertical first leg, the fork having tines spaced apart to vertically hang a guitar.

2. The guitar hanging device of claim 1, further comprising a second bracket vertically adjustable with respect to the first bracket and having a substantially horizontal second leg and a substantially vertical second leg, the second bracket being adjustably connected to the first bracket with the substantially horizontal second leg adjustable in elevation with respect to the substantially horizontal first leg to clamp a portion of one of the two external objects and configured to clamp one of the two external objects on a front side thereof between the first bracket and the second bracket.

3. The guitar hanging device of claim 2, comprising a resilient pad fixed onto a top surface of the substantially horizontal first leg having a thickness compressible to take up any vertical clearance between the two external objects.

4. The guitar hanging device of claim 3, comprising a hand-operated screw fastener arranged to fix the relative vertical elevation of the substantially horizontal first leg and the substantially horizontal second leg when tightened.

5. The guitar hanging device of claim 2, comprising a hand-operated screw fastener arranged to fix the relative vertical elevation of the substantially horizontal first leg and the substantially horizontal second leg when tightened.

6. The guitar hanging device of claim 1, comprising a resilient pad fixed onto a top surface of the substantially horizontal first leg having a thickness compressible to take up any vertical clearance between the two external objects.

7. In combination, a guitar head amplifier, a speaker cabinet and a guitar hanging device, wherein the head amplifier is sized to set on top of the speaker cabinet with a vertical clearance between a portion of a bottom surface of the head amplifier and a portion of a top surface of the speaker cabinet, wherein the guitar hanging device includes a substantially L-shaped first bracket having a substantially horizontal first leg and a substantially vertical first leg, a hanging fork structure connected to the substantially vertical first leg, wherein the substantially horizontal first leg is arranged to fit into the vertical clearance between the head amplifier and the speaker cabinet, the substantially horizontal first leg preventing overturning of the L-shaped bracket caused by the weight of a guitar hung from the hanging fork structure, by the substantially horizontal first leg pressing up against the head amplifier.

8. The combination according to claim 7, wherein the guitar hanging device further comprises a second bracket adjustably fixed at a relative position with respect to the first bracket to clamp a portion of the speaker cabinet between the first and second brackets.

9. The combination according to claim 8, wherein the second bracket is L-shaped and includes a substantially horizontal second leg and a substantially vertical second leg, wherein the substantially horizontal second leg is arranged to underly a frame of the speaker cabinet and the substantially vertical second leg is vertically adjustable with respect to the substantially vertical first leg of the first bracket and fixable thereto at a desired relative position.

10. A guitar hanging device, comprising:
   a first bracket having a substantially vertical first leg and a substantially horizontal first leg, the substantially horizontal first leg and sized and configured to fit between two external objects;
   a second bracket having a substantially horizontal second leg and a substantially vertical second leg, the second bracket being adjustably connected to the first bracket with the substantially horizontal second leg adjustable in elevation with respect to the substantially horizontal first leg to clamp a portion of one of the two external objects therebetween;
   a resilient pad fixed onto a top surface of the substantially horizontal first leg having a thickness compressible to take up any vertical clearance between the two external objects; and
   a guitar hanging fork structure attached to an upper portion of the substantially vertical first leg.

11. The guitar hanging device of claim 10 comprising a hand-operated screw fastener arranged to fix the relative vertical elevation of the substantially horizontal first leg and the substantially horizontal second leg when tightened.

* * * * *